(Specimens.)
2 Sheets—Sheet 1.
S. EVANS.
PROCESS OF ORNAMENTING GLASS.
No. 495,000. Patented Apr. 4, 1893.
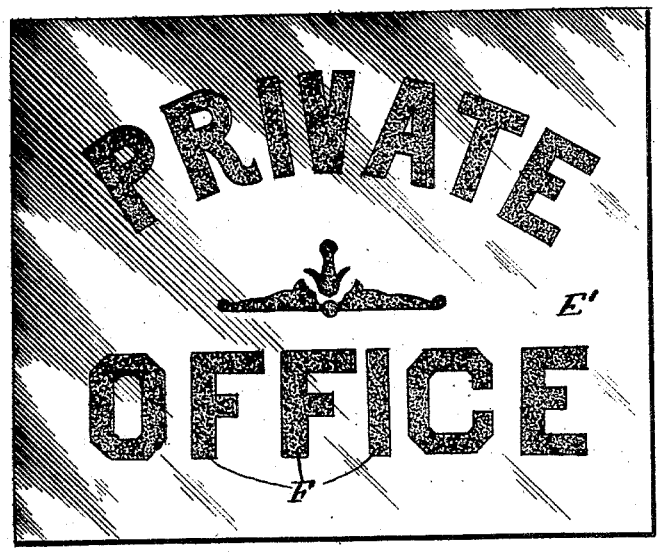
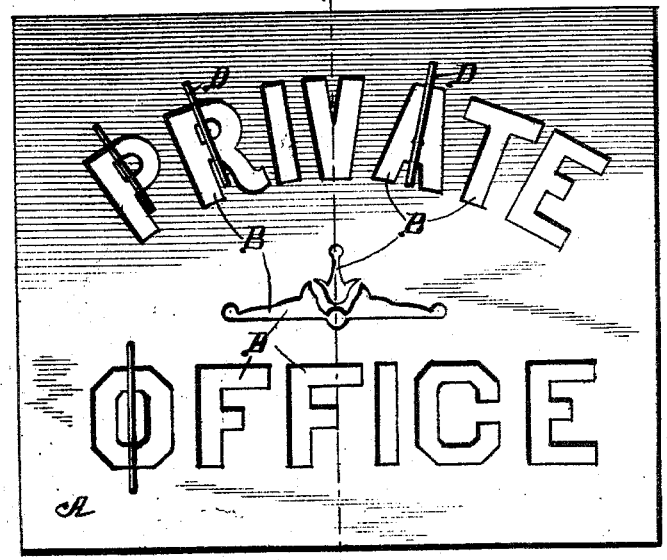
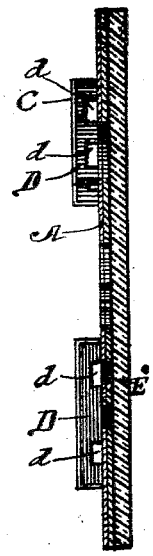
Witnesses:
Lute S. Alter,
Flora L. Brown,
Inventor:
Samuel Evans
By Charles T. Brown,
Atty (Specimens.)
2 Sheets—Sheet 2.
S. EVANS.
PROCESS OF ORNAMENTING GLASS.
No. 495,000.                    Patented Apr. 4, 1893.
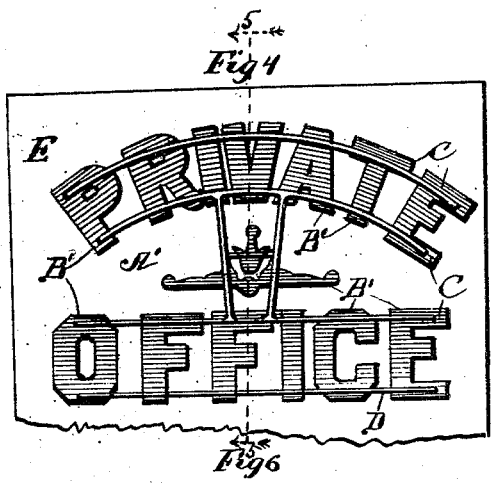
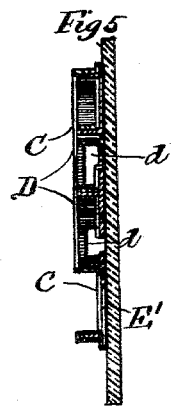
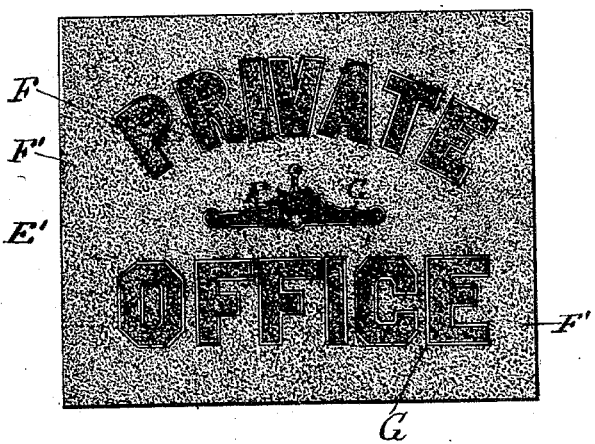
Witnesses:
Lute S. Alter
Flora L. Brown
Inventor:
Samuel Evans
By Charles T. Brown
Atty.

UNITED STATES PATENT OFFICE.

SAMUEL EVANS, OF CHICAGO, ILLINOIS, ASSIGNOR OF ONE-HALF TO CHARLES L. RAWSON, OF SAME PLACE.

PROCESS OF ORNAMENTING GLASS.

SPECIFICATION forming part of Letters Patent No. 495,000, dated April 4, 1893.

Application filed April 16, 1891. Serial No. 389,258. (Specimens.)

*To all whom it may concern:*

Be it known that I, SAMUEL EVANS, a resident of the city of Chicago, in the county of Cook and State of Illinois, have invented certain new and useful Improvements in Processes of Ornamenting Glass, of which the following is a specification.

My invention relates to the ornamentation of a sheet of clear glass by grinding and chipping determined portions but not all, of one or both faces thereof, and the obtaining of a sheet of glass ornamented by designs produced by the combined effect of chipped and clear and of ground, chipped and clear glass.

The objects of the invention are, first, to obtain a process whereby a plate or sheet of glass can be produced having clear and chipped faces, or clear, ground and chipped faces thereon, combined in a determined manner such faces consisting of surfaces having curved, straight or broken boundary lines, grouped and arranged as desired and having sharp and clearly defined contours. Secondly, to obtain a process whereby such determined designs can be readily reproduced upon any number of sheets of glass at small cost and with pleasing and desirable predetermined effects. Thirdly, to obtain a series of sheets of glass each thereof ornamented by a like determined design composed of the combination of clear and chipped, or clear, ground and chipped surfaces, so that in case of breakage of a sheet or pane thereof the same can be replaced with a sheet having a like design.

In the ornamentation of a sheet of glass by this process the entire surface thereof, excepting so much as is to appear clear glass in a completed design, is subjected to the direct action of a blast of sand driven against it by the well known sand blast process. The order, in point of time, in which the grinding is done to the portions of the sheet of glass which are to appear ground and the portions which are to appear as chipped in a completed design having clear, ground and chipped surfaces, or whether such portions are both ground at one and the same time, is immaterial; in whatever order the grinding is done, however, or in whatever manner the sheet of glass is prepared for such grinding, that portion of the surface which is to appear as chipped glass in the completed design must be ground and a chipping compound applied thereto, and to enable me to apply the chipping compound to the entire surface of the glass a coating of material adapted to protect the surface of the glass therefrom is interposed between the glass and the chipping compound.

To obtain in the practice of this process, the best defined contour lines in the ground glass and in the chipped glass portions of the ornamented sheet of glass, I have found it necessary in the grinding of the glass by the sand blast process to apply a liquid coating of the shellac of commerce to the glass and to allow such coating to dry before laying the pattern or patterns thereon and subjecting such glass protected in parts thereof by the pattern to the sand blast process, although a liquid coating of japan, or any quick drying varnish, or even asphaltum, applied to the glass and allowed to dry can be used as a substitute for the coating of shellac, and well defined contour lines will be obtained thereby. While japan, a quick drying varnish, or even asphaltum can be used as a substitute for the liquid shellac of commerce for the production of definite contour lines to the ground glass, such coating of shellac cannot be used as a substitute for the coating of asphaltum or other like material employed for the protection of the portion of the sheet of glass which is not to be chipped from the chipping compound by being interposed between such portions of the glass and such chipping compound. When both a coating of shellac and asphaltum, or its equivalent, are interposed between the glass and the chipping compound, the shellac remaining on the glass after the grinding will adhere to the glass during and after the chipping, while the coating of asphaltum, or its equivalent, thereover will adhere to and be taken off the glass by the chipping compound; but if japan, a quick drying varnish or asphaltum, be employed as a substitute for the coating of shellac and a second coating of asphaltum, or its equivalent, be placed thereover, both coats so interposed between the glass and the chipping compound will adhere to the chipping compound and come off the glass in or during the chipping. Whether a coating of shellac, asphaltum, or other material be employed to obtain definite contour lines in the grinding of the glass, on the portion showing as clear glass in the completed design such coating will remain undisturbed, and although the coating of shellac is not taken off the glass by the chipping compound while the coating of asphaltum if used as a substitute for the coating of shellac is so taken off, yet I have found it much easier to clean the glass where the shellac coating is first used, after the completion of the process; and have also found, where shellac is used, better contour lines in both the ground and chipped portion of the design are produced.

Where the grinding of the portions of the glass which are to appear in the completed design as chipped and ground glass is done at the same time, a coating of liquid shellac of commerce, covered by a coating of asphaltum or equivalent material are, preferably, first applied to the glass over the entire surface thereof, and a pattern adapted to protect the part to appear as clear glass in the completed design, and that part only, is placed on the glass over the coatings and the glass then subjected to the sand blast process, after which a coating of asphaltum is applied to the part of the glass, if any, to appear ground in the completed design, and then a chipping compound is applied to the entire surface of the glass and allowed to dry.

I have illustrated my invention by the drawings accompanying and forming a part hereof, in which Figure 1 is a face view of a pattern employed in one of the steps of my process; Fig. 2 a sectional view thereof on line 2—2 on Fig. 1. Fig. 3 is a plate of glass which has been subjected to the sand blast process with the pattern illustrated in Fig. 1 and Fig. 2 placed thereover, such plate of glass being thereby partially ground by the sand blast process. Fig. 4 is a pattern also used in one of the steps of the process. Fig. 5 is a sectional view of the pattern, illustrated in Fig. 4. on line 5—5 of Fig. 4. Fig. 6 is a sheet of glass which has been subjected to the sand blast process with the pattern illustrated in Figs. 1 and 2 thereon, and also with the patterns illustrated in Figs. 4 and 5 thereon. Fig. 7 is a plate of glass ornamented by the herein described process.

The same letters of reference refer to corresponding parts where more than one view thereof is given.

A, A' are patterns; and B, B' are the designs cut through or out of the material of which the patterns A, A' are, respectively, constructed.

C is a coating of oleaginous, gelatinous or other elastic material, on patterns A, A', adapted to protect the material of such patterns from the action of the sand driven against them, respectively, by the sand blast process.

In order to use the patterns A, A', respectively, a great number of times, as is necessary in producing a series of ornamented sheets of glass, each sheet of such series ornamented by the same design, I find it necessary to construct the patterns of ductile sheet metal, preferably zinc, protected on the upper surface thereof by the coating C. And too, where the designs in the pattern A, A', or either of them, are complicated in character it is sometimes necessary to have ties connecting or tying together the several parts or portions of the patterns, and in such case it is also necessary to construct the ties of such ductile sheet metal, preferably protected as described.

D, D, are ties, having notches $d, d,$ therein, secured to the patterns and connecting the several parts thereof together.

E is a sheet of glass which is to be ornamented by my process, and E' is such sheet partially so ornamented.

F is that portion of a sheet of glass which is ground when the sheet is subjected to the sand blast process with the pattern A thereon; that is, with a pattern by which a ground glass design is produced surrounded by clear glass, when such sheet of glass is subjected to the sand blast process with such pattern properly placed thereon.

F' is that portion of a sheet of glass which is ground by subjecting it to the sand blast process with the pattern A' thereon; that is, with a pattern by which ground glass is produced surrounding a clear glass design when such sheet of glass is subjected to the sand blast process with such pattern properly placed thereon.

Where the patterns are, consecutively, placed on a sheet of glass and such sheet in turn is subjected to the sand blast process it will prevent the appearance of sheet E' in Fig. 6 of the drawings.

G is that portion of the sheet of glass which is to appear as clear glass in the completed design, such clear glass extending entirely around the chipped portion of the design between it and the ground glass portion thereof.

H is the chipped portion of the completely ornamented sheet of glass.

Where the glass to be ornamented is ground in one operation, both in the portion of the design appearing as chipped and the portion appearing as ground glass, but one pattern is used, and the operation is: First, a sand blast protective coating, preferably shellac, is applied, in a liquid form to the entire surface of the glass and allowed to dry, and then a chipping protective coating is applied, in a liquid form thereover and allowed to dry. A pattern adapted to resist the action of the sand blast is then applied to the sheet of glass over the protective coatings and the glass as thus prepared subjected to the sand blast process. If the design is to appear as chipped glass a glass chipping compound is then applied over the entire surface of the glass, but with the protective coatings where not removed by the sand blast process, interposed between the glass and the chipping compound. After the chipping is completed the glass is cleaned and the ornamentation is completed. If the design is to appear as chipped and ground glass, as chipped surrounded by ground, or as ground surrounded by chipped glass, after the completion of the grinding as described, a coating of chipping protective compound, preferably asphaltum, is applied to the glass or portion thereof to appear as ground glass in the completed design, and the chipping compound is then applied, as before, to the entire surface of the glass. This application of chipping protective compound is easily effected with a brush, as it can overlap on to the coatings remaining on the portions of the glass to appear as clear glass in the completed design, and such portions of clear glass entirely surround the portions to appear as ground glass and to which the chipping protective coating is so applied.

Where, as is usually the case, the completed design is to consist of combined, clear, ground and chipped glass, and two patterns are employed in the sand blast process, one for protecting the sheet of glass in the portions thereof to appear as ground and clear in the completed design and one for protecting such sheet in the portions thereof to appear as chipped and clear, a variation is possible in the order of the taking of the several steps necessary; but such variation constitutes no material change in my invention, and I will first describe the preferable way of producing such ornamentation by my process.

Cover the entire surface of the glass on the side thereof to be exposed to the sand blast process, with a sand blast protective coating in a liquid condition, preferably shellac, and allow it to dry; then lay thereon pattern A and subject the glass so protected to the sand blast process, thereby grinding the portions of the glass to appear as ground glass in the completed design. Next cover the entire surface of the glass, in the side thereof which has been exposed to the sand blast process, with a chipping protective coating in a liquid condition, preferably asphaltum, allow it to dry, and then place pattern A' over the sheet of glass and again subject such sheet of glass so protected to the sand blast process, thereby grinding the portions thereof to appear as chipped glass in the completed design. Then remove the pattern and cover the entire surface of the glass with a chipping compound and allow it to dry. Upon the completion of the glass chipping process the ornamentation will be complete. If the chipping protective coating is not applied, as last described to the glass, prior to the grinding of the portion thereof to appear as chipped glass in the completed design, the chipping protective coating, preferably asphaltum, must be applied by hand to the portions of the glass to appear as ground and clear in the completed design and although this can be readily done with a brush in designs of a simple character and to make the contour or boundary lines of the chipping protective compound practically coincident with the contour or boundary lines of the sand blast protective compound, it is difficult to so apply it in extended or complicated designs and I do not consider such mode of applying such coating desirable.

A second and effective order of procedure of the several steps necessary in my process is: The sand blast protective coating, preferably shellac, is first applied to the entire surface of the sheet of glass on the side thereof to be exposed to the sand blast process and when dry a second and chipping protective coating is applied, also in a liquid condition, entirely thereover and allowed to dry. The pattern properly prepared, as described, to resist the action of the sand blast and adapted to protect the glass in the portions thereof to appear as clear and ground glass in the completed design, is then placed over the sheet of glass and such glass so protected is subjected to the sand blast process, after which the chipping compound is applied to the entire surface of the glass. If, as preferred, the sand blast protective coating employed be shellac, such coating will be found, after the completion of the chipping process, sufficiently intact to permit the immediate placing upon the sheet of glass, of the pattern adapted to protect the portions of the glass to appear as clear and chipped in the completed design, from the action of the sand blast, and the sheet of glass so protected can be and is again subjected to the sand blast process, after which the glass is cleaned and the ornamentation is completed. If, however, a coating of asphaltum, or its equivalent, is employed for the sand blast protective coating, it will be necessary, after the completion of the chipping process, to again apply a sand blast protective compound, preferably shellac, to at least the portion of the glass to appear as clear glass in the completed design, (such portion entirely surrounding the chipped glass portion of the design,) before placing the last named pattern thereover and subjecting the glass to the sand blast process as last above described.

A still further or other variation of the order of the several steps required is: The sand blast protective coating, preferably shellac, is applied in a liquid condition to the entire surface of the glass, allowed to dry and then a chipping protective coating is applied over the first named coating. The pattern A' is then placed over the sheet of glass and such sheet of glass so protected is subjected to the sand blast process, thereby grinding the portions of the glass which are to appear as chipped glass in the completed design. After such grinding pattern A is substituted for pattern A' and the glass so protected is again subjected to the sand blast process, thereby grinding the portions of the glass to appear as ground glass in the completed design. A chipping compound protective coating, preferably asphaltum, is then applied with a brush to the portion of the glass last ground, allowed to dry and the glass chipping compound then applied to the entire surface of the glass on the side thereof on which the several protective coatings have been applied.

I have found by practice that when the several protective coatings are applied in such order as that the contour lines thereof shall all be produced by and during the submission of the glass with the several patterns thereover to the sand blast process, whereby the contour lines of such coatings and the contour lines of the ground glass which are to appear as chipped glass in the completed design are coincident, the chipping of the glass will commence at the edge of the clear or unground portion thereof, and will extend therefrom in toward the center of the ground portion which is to appear as chipped in the completed design and hence by this process when the several steps are taken as above described so that the contour lines of the clear glass and the ground glass which is to appear as chipped glass in the completed design are made and determined by the grinding process definite contour lines to the chipped portion of the design are obtained and hence such order of the several steps is by me in all cases preferred over that course of taking the several steps which requires any of the protective coatings to be applied with the brush in a manner to produce the contour lines of the portions of the glass to appear as chipped in the completed design with such brush.

The phrase "sand blast protective coating" herein before employed whether applied to a coating of shellac, as preferred, or to a coating of asphaltum, japan, or quick drying, placed on the glass as described, is not to be understood to mean a coating adapted to protect the glass from the direct action of sand in the sand blast process, but to mean a coating adapted to protect the glass from the indirect action of scattering grains of sand diverted outside the portions of the glass desired to be ground when a pattern made as described and adapted to resist the direct action of the sand is placed thereon, as stated.

Having thus described my invention, what I claim, and desire to secure by Letters Patent, is—

1. The process of ornamenting glass which consists of applying a sand blast protective coating adhering thereto to the entire surface of a sheet of glass, of applying a chipping protective coating to the entire surface of the glass thereover, of placing a pattern thereover adapted to resist the direct action of the sand in the sand blast process, of subjecting the glass so prepared to the action of the sand blast process, thereby simultaneously removing the coatings over and grinding portions of the glass, and of applying a glass chipping compound to the entire surface of the glass with such coatings where remaining thereon interposed between the glass and the chipping compound, and allowing such chipping compound to dry; substantially as described.

2. The process of ornamenting glass which consists of applying a sand blast protective coating adhering thereto to the entire surface of a sheet of glass, of applying a chipping protective coating to the entire surface of the glass thereover, of placing a pattern thereover adapted to resist the direct action of the sand in the sand blast process, of subjecting the glass so prepared to the action of the sand blast process, thereby simultaneously removing the coatings over and grinding portions of the glass, of applying a chipping protective coating to the portions of the glass thereby ground and to appear ground in the completed design, of applying a glass chipping compound to the entire surface of the glass with the coatings thereon interposed between the glass and the chipping compound, and allowing such chipping compound to dry; substantially as described.

3. The process of ornamenting glass which consists of applying a sand blast protective coating adhering thereto to the entire surface of a sheet of glass, of placing a pattern thereover adapted to resist the direct action of the sand in the sand blast process, of subjecting the glass so prepared to the action of the sand blast process, of applying a chipping compound protective coating adhering thereto to the entire surface of the sheet of glass on the side thereof exposed to the sand blast process, of placing a second pattern thereover adapted to resist the direct action of the sand in the sand blast process, of subjecting the glass so protected to the action of the sand blast process, thereby simultaneously removing the chipping compound protective coating over and grinding portions of the glass, of applying a glass chipping compound to the entire surface of the glass with the coatings thereon interposed between the glass and the chipping compond, and allowing such chipping compound to dry; substantially as described.

4. The process of ornamenting glass which consists of applying a sand blast and glass chipping compound protective coating adhering thereto to the entire surface of a sheet of glass, of placing a pattern thereover adapted to resist the direct action of the sand in the sand blast process, of subjecting the glass so prepared to the action of the sand blast process, of applying a glass chipping compound to the entire surface of the glass and allowing such chipping compound to dry, of applying a sand blast protective coating adhering thereto to the entire surface of the sheet of glass on the side thereof exposed to the sand blast and glass chipping process, of placing a second pattern thereover adapted to resist the direct action of the sand in the sand blast process and to protect the portions of the glass to appear as clear and chipped in the completed design; and of subjecting the glass so protected to the action of the sand blast process; substantially as described.

SAMUEL EVANS.

Witnesses:
CHARLES T. BROWN,
FLORA L. BROWN.